US008443161B2

(12) United States Patent
Cho et al.

(10) Patent No.: US 8,443,161 B2
(45) Date of Patent: May 14, 2013

(54) CACHE MEMORY SYSTEMS HAVING A FLEXIBLE BUFFER MEMORY PORTION AND METHODS OF OPERATING THE SAME (75) Inventors: Sang-yeun Cho, Seoul (KR); Woo-young Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 1475 days.

(21) Appl. No.: 10/886,168

(22) Filed: Jul. 7, 2004

(65) Prior Publication Data
US 2005/0010723 A1 Jan. 13, 2005

(30) Foreign Application Priority Data

Jul. 12, 2003 (KR) .................. 10-2003-0047539

(51) Int. Cl.
*G06F 12/02* (2006.01)
(52) U.S. Cl.
USPC ............................ 711/170; 711/118; 711/171

(58) Field of Classification Search .................. 711/118, 711/170, 171
See application file for complete search history.

(56) References Cited

U.S. PATENT DOCUMENTS

| 5,301,295 | A | * | 4/1994 | Leary et al. ................... 711/125 |
| 5,668,968 | A | * | 9/1997 | Wu ................................... 711/3 |
| 5,870,551 | A | | 2/1999 | Ozden et al. ............. 395/200.49 |
| 6,157,987 | A | * | 12/2000 | Krishnamurthy et al. .... 711/129 |
| 6,161,153 | A | | 12/2000 | Porterfield et al. ............. 710/52 |
| 6,295,581 | B1 | | 9/2001 | DeRoo ............................ 711/135 |
| 6,470,443 | B1 | | 10/2002 | Emer et al. ...................... 712/205 |
| 7,089,362 | B2 | * | 8/2006 | Creta et al. ..................... 711/133 |

* cited by examiner

*Primary Examiner* — Jae Yu
(74) *Attorney, Agent, or Firm* — Myers Bigel Sibley & Sajovec, P.A.

(57) ABSTRACT

A cache memory system includes a cache memory that includes a first memory portion and a flexible buffer memory portion. A cache controller is coupled to the cache memory and is configured to control allocation and/or deallocation of blocks from the first memory portion to and/or from the flexible buffer memory portion.

13 Claims, 12 Drawing Sheets

FIG. 11C

CACHE MEMORY SYSTEMS HAVING A FLEXIBLE BUFFER MEMORY PORTION AND METHODS OF OPERATING THE SAME

CROSS REFERENCE TO RELATED APPLICATION

This application claims the priority of and priority to Korean Patent Application No. 2003-47539, filed on Jul. 12, 2003, the disclosure of which is hereby incorporated by reference as if set forth in its entirety.

FIELD OF THE INVENTION

The invention relates to a digital data processing systems and methods of operating the same, and more particularly, to cache memory systems and methods of operating the same.

BACKGROUND

Figure 1:
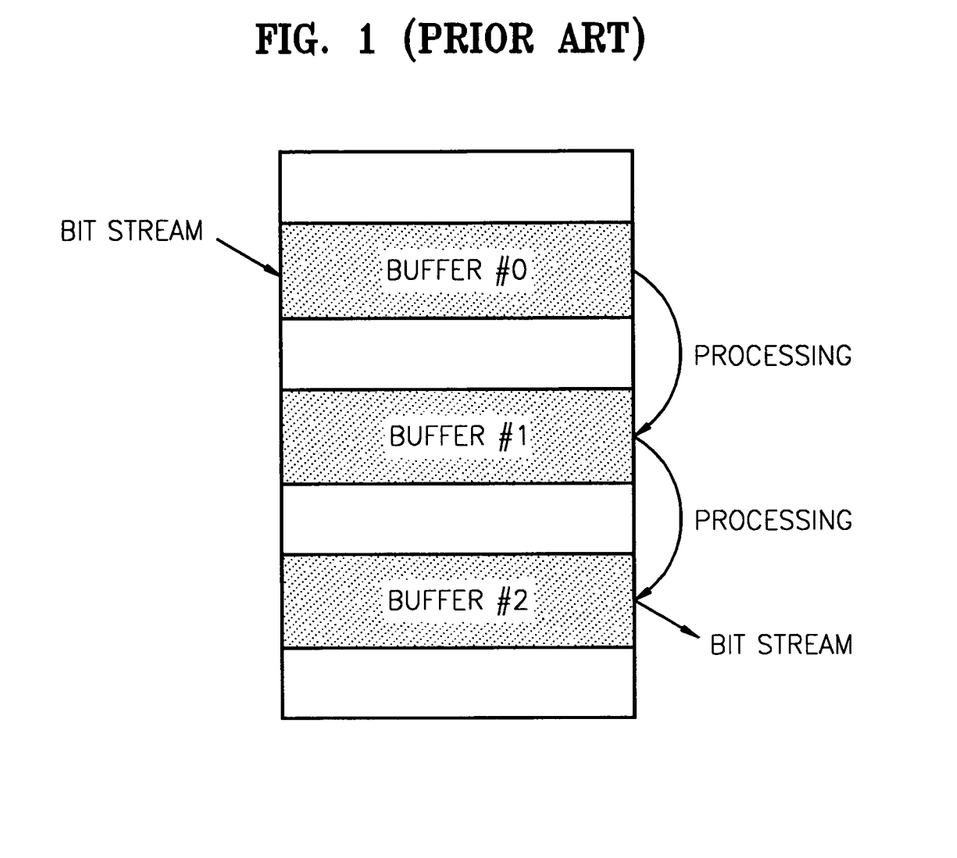
FIG. 1 is a block diagram that illustrates operation of a conventional buffer memory.

Algorithms implemented in digital data processing systems, such as a programmable micro processor and a digital signal processor (DSP), may use a part of a memory as a buffer to store or read operation results. As shown in FIG. 1, temporal operation results generated during implementation of algorithms are written to a buffer memory in the form of bit streams, such as 8-bit streams, 16-bit streams, 32-bit streams, or 64-bit streams. Under the control of a microprocessor, such data bit streams may be transferred to another address of the buffer memory or are read for use in another operation.

Figure 2A:
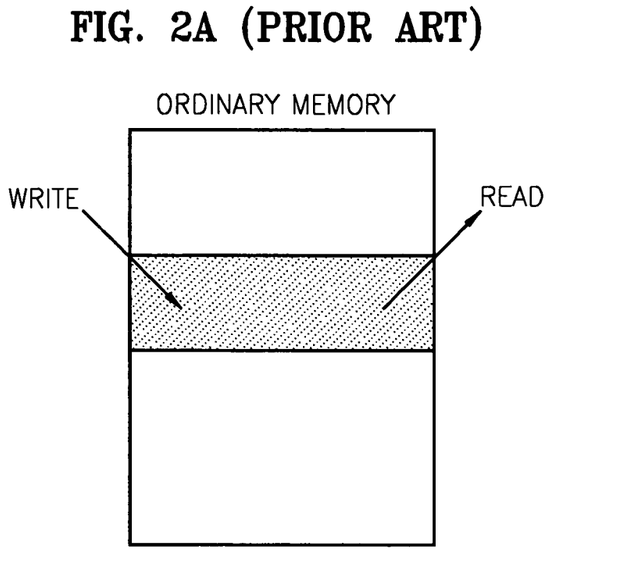
FIG. 2A is a block diagram that illustrates access of a conventional memory.
Figure 2B:
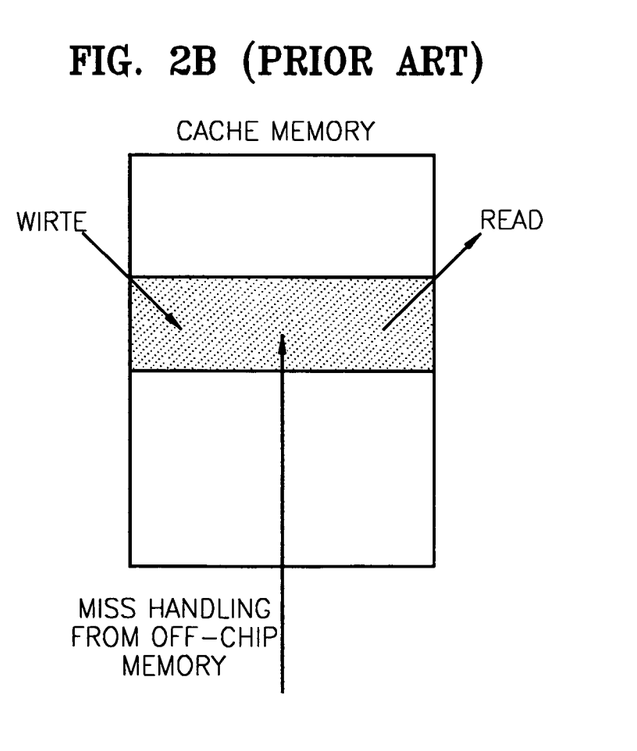
FIGS. 2B, 3A, 3B, and 4 are block diagrams that illustrate operations for handling cache misses for various conventional cache memory types.

In an ordinary memory without considering the operation of a cache memory, data is written to or read from a valid address without the occurrence of a miss or hit, as shown in FIG. 2A. However, when a memory system uses a cache memory as a buffer, data transmission to an off-chip memory may result from a cache miss as shown in FIG. 2B. This may cause degradation in the performance of the entire memory system. In addition, in a write-back operation of the cache memory, when data that has been written at least once is replaced in the cache memory, data transmission to the off-chip memory may be unnecessary. General operations of cache memories are described, for example, in U.S. Pat. No. 6,470,443, the disclosure of which is hereby incorporated herein by reference.

Figure 3A:
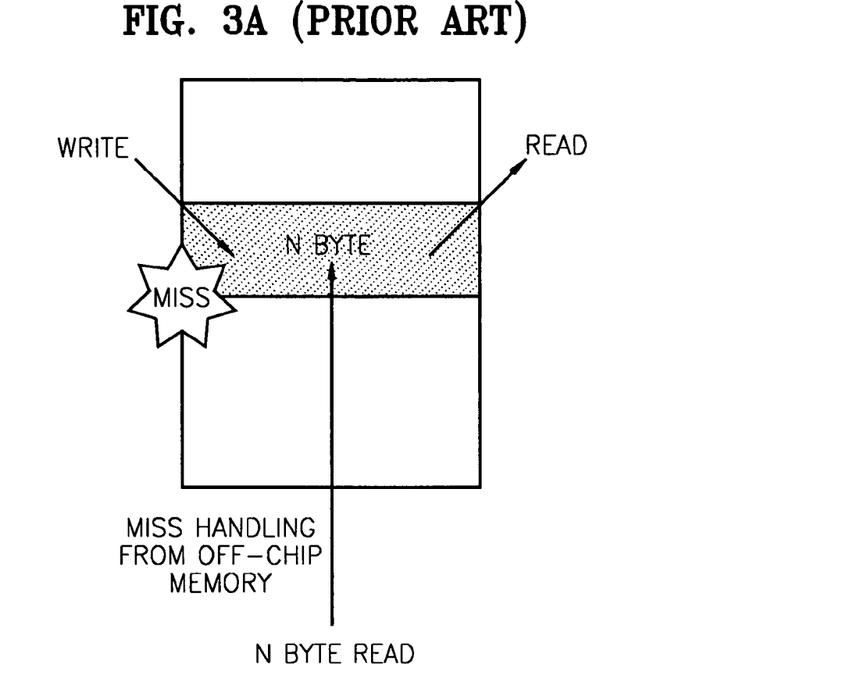
Figure 3B:
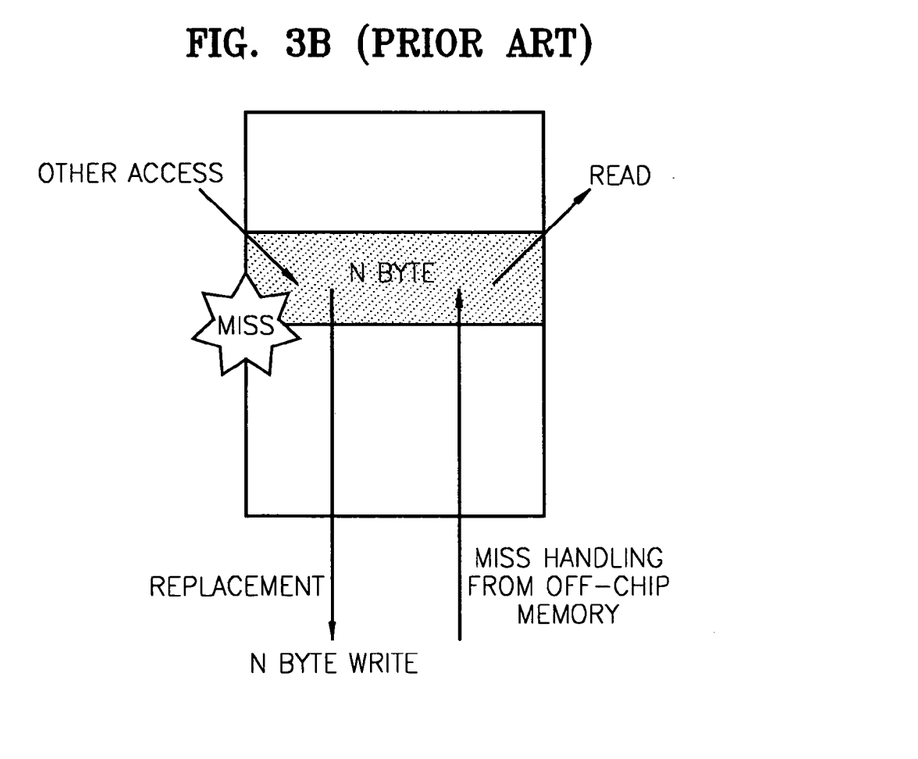

FIGS. 3A and 3B are diagrams that illustrate operations for handling cache misses in a write-back write-allocate cache memory. It is assumed that a buffer size is N. This type of cache memory, as shown in FIG. 3A, causes a cache miss while an initial write operation is performed on a buffer, thereby reading out N bytes of data from an off-chip memory. The operating speed of the entire memory system may decrease due to the off-chip memory access. Moreover, this may result in relatively high power consumption. Also, as shown in FIG. 3B, data updated by the write operation is transmitted to the off-chip memory in the end when the replacement is made. Similarly operating speed of the entire memory system may decrease due to the N byte data transmission and may also result in relatively high power consumption.

Figure 4:
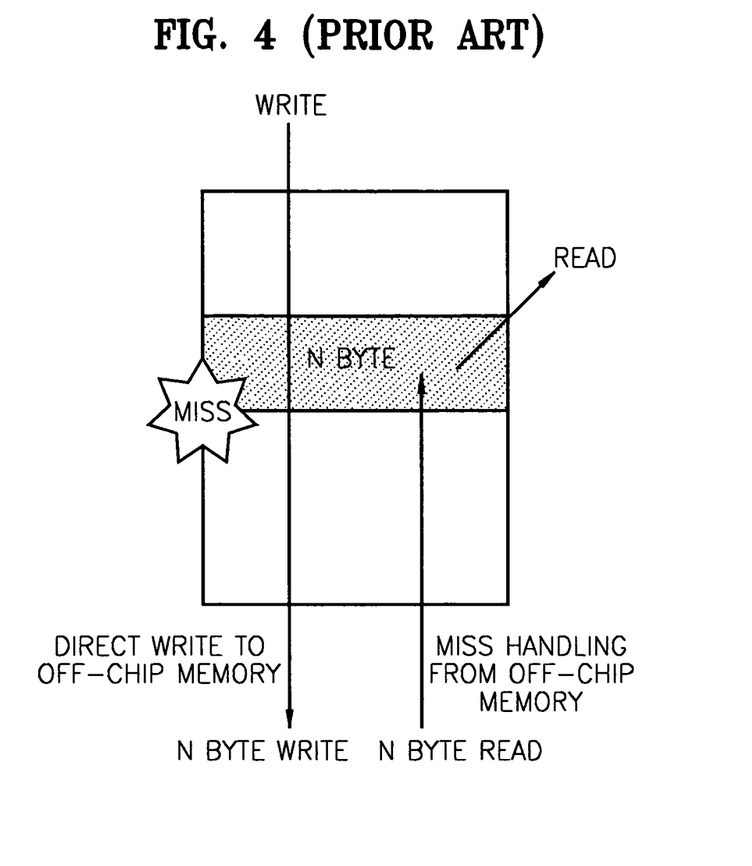

FIG. 4 is a diagram that illustrates operations for handling cache misses in a write-through write-no allocate cache memory. It is assumed that the buffer size is N bytes. In this type of cache memory, as shown in FIG. 4, a bus is occupied in the first N-byte data write operation, data in the off-chip memory is updated, and an access to the N-byte data in the off-chip memory occurs in a later read operation. The operating speed of the entire memory system may decrease due to the access of the off-chip memory and a relatively large amount of power may be consumed. In other words, cache memories may require an access to 2N-bytes of data in the off-memory chip, which may degrade system performance and may increase power consumption.

A part of the cache memory may be used for a buffer, like a static random access memory (SRAM). In this case, however, an address and a size of a storing place of the cache memory used for the buffer may be fixed. As a result, the cache memory may not be used as efficiently.

SUMMARY

According to some embodiments of the present invention, a cache memory system includes a cache memory that includes a first memory portion and a flexible buffer memory portion. A cache controller is coupled to the cache memory and is configured to control allocation and/or deallocation of blocks from the first memory portion to and/or from the flexible buffer memory portion.

In other embodiments, the cache memory system further includes a processor and the cache controller is further configured to generate a buffer block allocation control signal and/or a buffer block deallocation control signal responsive to access of the cache memory by the processor. Moreover, the cache memory is configured to allocate blocks from the first memory portion to the flexible buffer memory portion responsive to the buffer block allocation control signal and to deallocate blocks from the flexible buffer memory portion to the first memory portion responsive to the buffer block deallocation control signal.

In still other embodiments, the cache controller includes a logic circuit that includes a mode register and an index address register and is configured to generate a buffer block allocation request signal and/or a buffer block deallocation request signal responsive to the mode register being set by the processor and/or an index address being stored in the index address register by the processor. A control portion is coupled to the logic circuit that is configured to generate the buffer block allocation control signal responsive to the buffer block allocation request signal and to generate the buffer block deallocation control signal responsive to the buffer block deallocation request signal.

In still other embodiments, the cache memory is further configured to deallocate blocks from the flexible buffer memory portion to the first memory portion responsive to the buffer block deallocation control signal by setting respective validity bits in the blocks to be deallocated indicating that the blocks are invalid.

In still other embodiments, the first memory portion includes a tag memory portion and a data memory portion.

In still other embodiments, the tag memory portion is configured to store a tag address in a location that corresponds to a relative location of the index address in an address space of the processor, and the data memory portion is configured to store data in a location that corresponds to a relative location of an offset address in an address space of the processor.

In still other embodiments, the blocks to be allocated to the flexible buffer memory portion are configured to store data for indexed addresses that are associated with a mode that is set in the cache controller.

In still other embodiments, the blocks to be allocated to the flexible buffer memory portion are configured to store data for indexed addresses that are associated with a contents of an index address register of the cache controller.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents; and alternatives falling-within the spirit and scope of the invention as defined by the claims. Like numbers refer to like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

Figure 5:
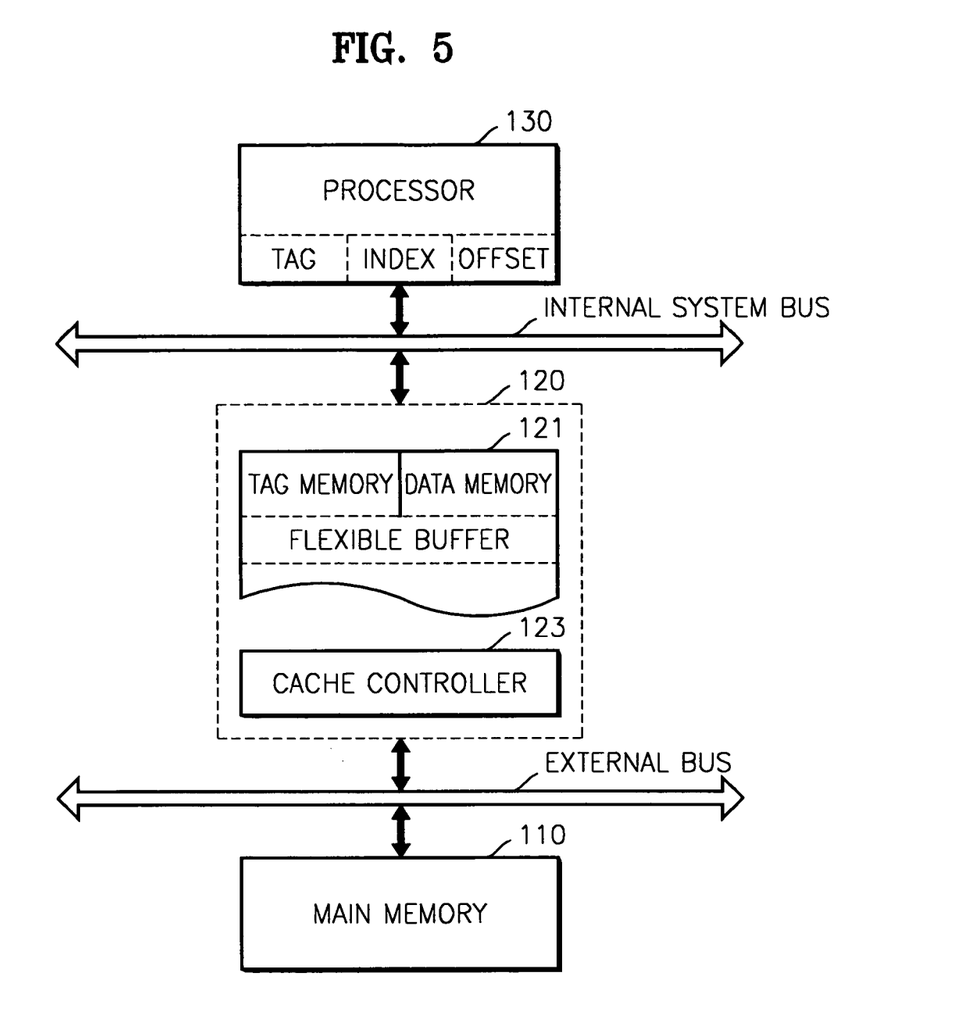
FIG. 5 is a block diagram of a digital data processing system including a cache memory system according some embodiments of the present invention.
Figure 6:
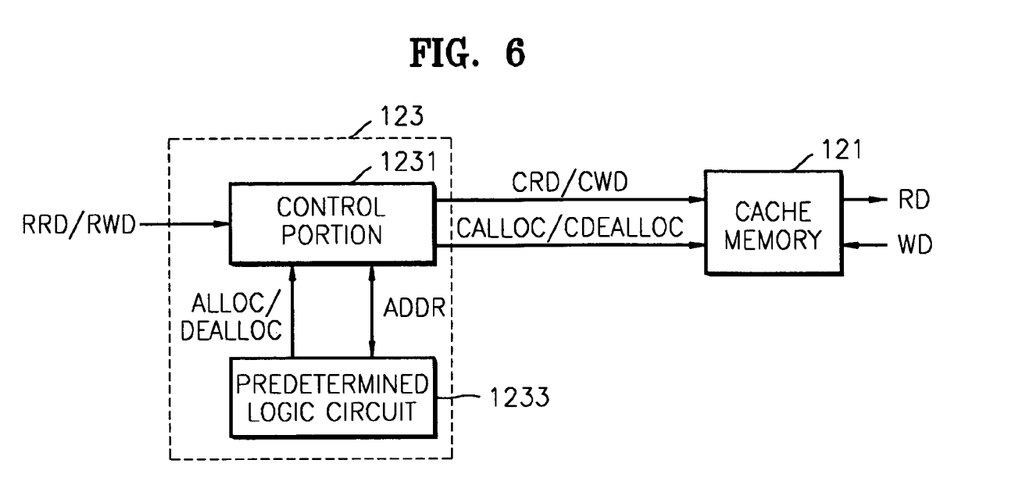
FIG. 6 is a block diagram that illustrates the cache memory system of FIG. 5 in accordance with some embodiments of the present invention.

FIG. 5 is a block diagram of a digital data processing system including a cache memory apparatus 120 according to some embodiment of the present invention. FIG. 6 is a block diagram that illustrates the relationship between a cache controller 123 and a cache memory 121 of FIG. 5 in more detail.

Referring now to FIG. 5, the digital data processing system, according to some embodiments of the present invention, includes a main memory 110, cache memory system or apparatus 120, and a processor 130. Signals and/or data are transmitted between the processor 130 and the cache memory apparatus 120 through an internal system bus and are transmitted between the cache memory apparatus 120 and the main memory 110 through an external bus. In addition, signals and/or data are transmitted between the processor 130 and the main memory 110 through the cache memory apparatus 120.

The main memory 110 stores instructions and/or data. The main memory 110 may be a system memory, such as a static random access memory (SRAM) or flash memory. The cache memory apparatus 120 may operate as a temporary storage device mounted between the processor 130 and the main memory 110. When the processor 130 accesses the main memory 110 and reads or writes instructions or data, the cache memory apparatus 120 stores copies of frequently used instructions or data and provides required information to the processor 130, thereby reducing the amount of time necessary for the processor 130 to read data from and write data to the main memory 110, which may increase the operating speed of the digital data processing system. A general digital data processing system may include a SRAM buffer therein for digital data processing. A cache miss is generated when information stored in a tag memory of the cache memory 121 corresponding to a tag field of an address of the processor 130 is not valid or when the tag field and an index address of the address of the processor 130 are not identical to information stored in the tag memory although the information stored in the tag memory is valid. On the other hand, a cache hit is generated when the information stored in the tag memory is valid and the tag field and the index address of the address of the processor 130 are identical to information of the tag memory. General operations of a cache memory are described, for example, in U.S. Pat. No. 6,470,443.

The present invention may provide improvements upon a conventional cache memory by dynamically allocating a part of the cache memory 121 as a buffer for driving the cache memory apparatus 120 and/or deallocating the allocated part of the cache memory 121. The cache memory apparatus 120, according to some embodiments of the present invention, includes a tag memory and a data memory. Moreover, the cache memory apparatus may allocate some blocks of the tag memory and data memory corresponding to the tag memory as a flexible buffer in response to a buffer block allocation request signal ALLOC, and deallocate some blocks allocated as the flexible buffer in response to a buffer block deallocation request signal DEALLOC. The tag memory stores a tag address in a location corresponding to the index address among the addresses of the processor 130. The data memory stores data corresponding to an offset address among the addresses of the processor 130. The tag memory and the data memory may be SRAMs, in accordance with some embodiments of the present invention.

The processor 130 executes the instructions, generates addresses during execution of the instructions, and accesses the main memory 110 or the cache memory apparatus 120, thus reading or writing corresponding information.

Embodiments of the cache memory apparatus 120 will now be described in greater detail. Referring now to FIG. 5 and 6, the cache memory apparatus 120 includes the cache memory 121 and the cache controller 123. The cache memory 121 includes the tag memory, the data memory, and a dynamic buffer, i.e., the flexible buffer, in which some blocks of the tag memory and data memory corresponding to the tag memory are allocated to the flexible buffer in response to a buffer block allocation control signal CALLOC and some blocks allocated as the flexible buffer are deallocated in response to a buffer block deallocation control signal CDEALLOC.

The cache controller 123 controls operations of the cache memory 121 through a control portion 1231 when the processor 130 accesses the cache memory 121 and reads information from or writes information to the cache memory 121. The cache controller 123 includes the control portion 1231 and a predetermined logic circuit (an index storing register/mode setting circuit) 1233. The control portion 1231 controls operations of the cache memory 121, receives the buffer block allocation request signal ALLOC and the buffer block deallocation request signal DEALLOC, and generates the buffer block allocation control signal CALLOC and the buffer block deallocation control signal CDEALLOC. The predetermined logic circuit 1233 is set by the processor 130. In other words, a user can set an index address ADDR and a block size in which buffer block allocation or deallocation is performed in the predetermined logic circuit 1233 through the processor 130. Thus, the index address ADDR is stored in a register of the predetermined logic circuit 1233. Also, a user may directly set a mode in the register of the predetermined logic circuit 1233. In accordance with these user's settings, the predetermined logic circuit 1233 generates the buffer block allocation request signal ALLOC or the buffer block deallocation request signal DEALLOC. The buffer block allocation request signal ALLOC and the buffer block deallocation request signal DEALLOC are enable signals or disable signals that are generated according to buffer block allocation or deallocation, for example, when the index address ADDR and the block size are set by the user or the mode is set by the user.

Consequently, when the processor 130 accesses the cache memory 121, the cache controller 123 generates the buffer block allocation control signal CALLOC in response to the buffer block allocation request signal ALLOC generated by the predetermined logic circuit 1233, using a mode setting or the index address ADDR stored in the register. Also, when the predetermined logic circuit 1233 generates the buffer block deallocation request signal DEALLOC, the cache controller 123 generates the buffer block deallocation control signal CDEALLOC in response to the buffer block deallocation request signal DEALLOC, using the index address ADDR stored in the register. In FIG. 6, RRD and RWD are signals requesting the processor 130 to access the cache memory 120 and read information from or write information to the cache memory 120, respectively. CRD and CWD are a read control signal and a write control signal that are generated by the cache controller 123 in response to the RRD and RWD signals, respectively. As a result, data RD is read from the cache memory 121 and data WD is written to the cache memory 121.

Figure 9:
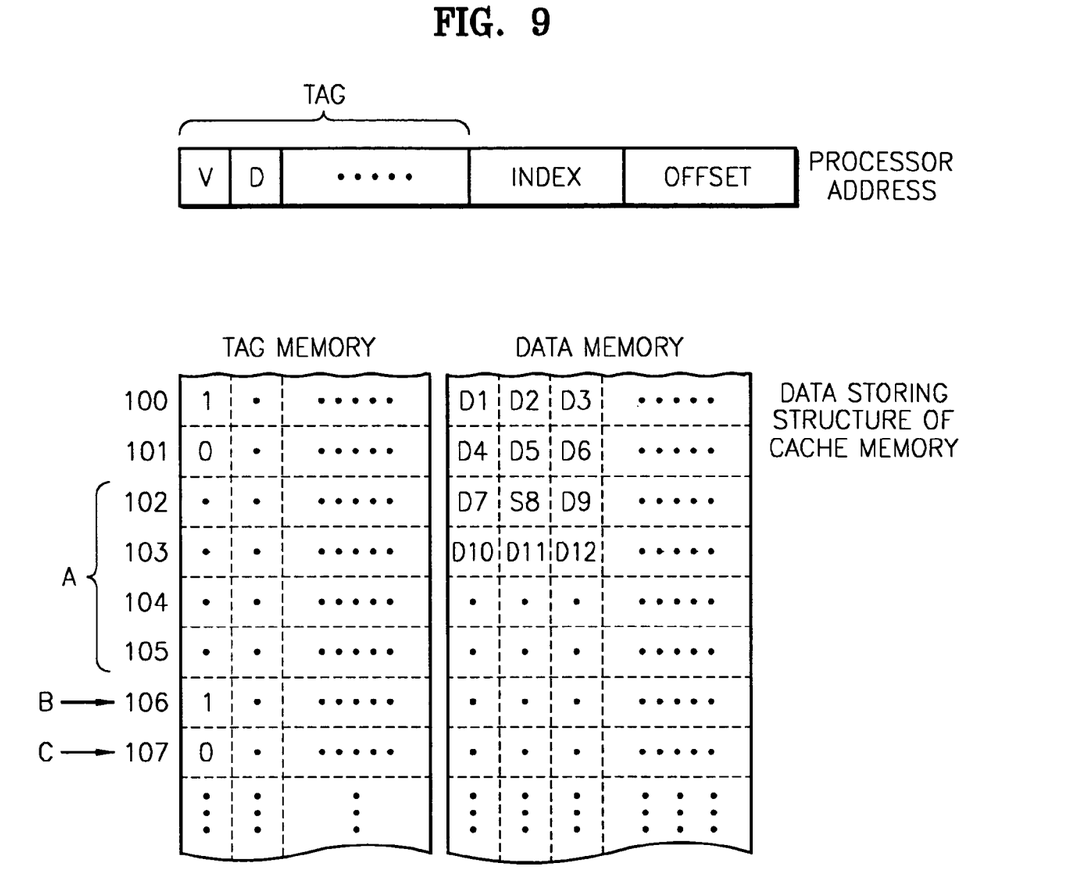
FIG. 9 is a block diagram that illustrates data storage in a cache memory in accordance with some embodiments of the present invention.
Figure 10:
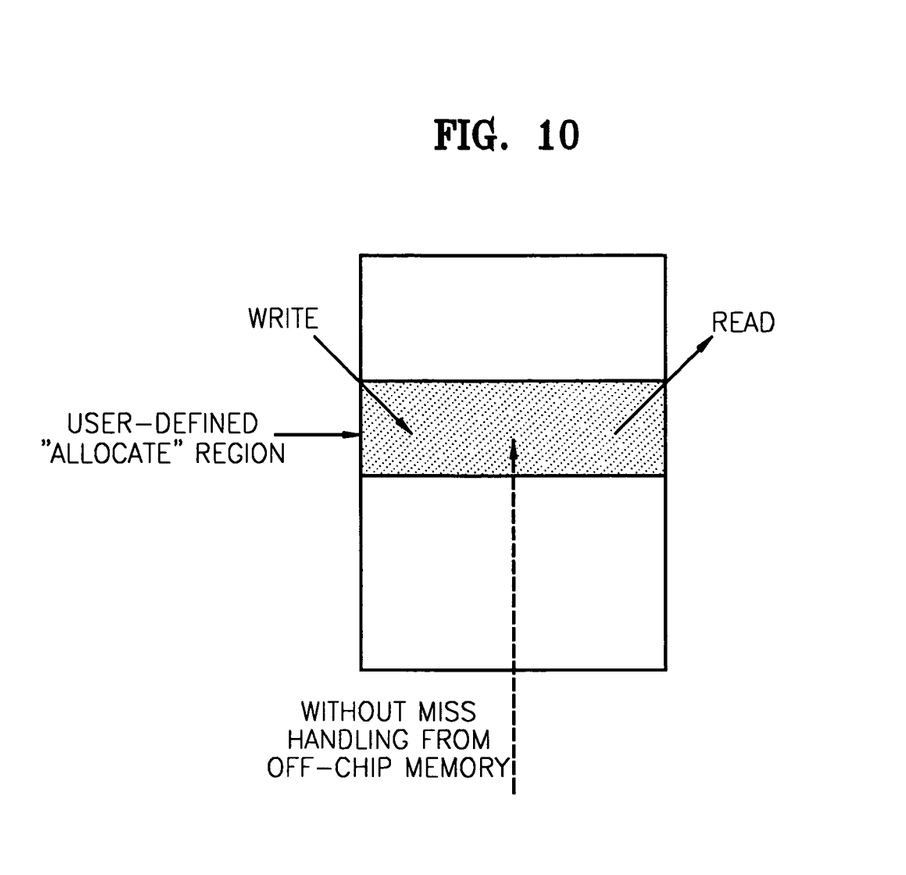
FIG. 10 is a block diagram that illustrates access to a cache memory during buffer block allocation in accordance with some embodiments of the present invention.

The blocks to be allocated as the flexible buffer serve as a storage location in the cache memory 121 corresponding to the indexed address by the user's mode set or corresponding to an index address ADDR-(which-is set in r1 of Algorithm 1 discussed below) used when the processor 130 accesses the cache memory 121. In other words, referring to FIG. 9, for the purpose of allocating blocks (e.g., blocks designated by A in FIG. 9) indicated by indexes 100, 101, . . . , 107, . . . , to the flexible buffer, the user may program the predetermined logic circuit 1233 as described above.

Flexible buffer allocation and deallocation are carried out when the processor 130 accesses the predetermined logic circuit 1233, sets a mode or stores the index address ADDR in the predetermined logic circuit 1233, and processes a corresponding instruction, during execution of a program. Likewise, when the cache controller 123 includes a block address generator and sequentially generates addresses of blocks to be allocated as the flexible buffer, flexible buffer allocation and deallocation may be performed by deallocating blocks currently allocated as the flexible buffer and automatically allocating blocks corresponding to the generated addresses as the flexible buffer. The blocks may be automatically allocated as the flexible buffer when the processor 130 accesses the cache memory 121. In other embodiments, the time when the blocks are automatically allocated as the flexible buffer may be prior to the time that the processor 130 accesses the cache memory 121.

When the use of the blocks in the flexible buffer is complete, the blocks may be deallocated. Once deallocated, the blocks return to their original function as the cache memory 121. At this time, although the blocks allocated as the flexible buffer are not deallocated, the operation of the cache memory apparatus 120 is not affected. To deallocate the blocks, for example, a portion indicated by C of FIG. 9, a valid bit V of a field forming a tag is set to a first logic state (e.g., a logic low state "0"), thereby invalidating the blocks to be deallocated. Use of the valid bit field V may alleviate problems in conventional cache systems, such as reduction of operating speed and increased power consumption, due to an unnecessary write operation to the main memory 110 when, like a portion of memory indicated by B of FIG. 9, the valid bit V of the deallocated blocks that have been temporarily used as the flexible buffer remains in a second logic state (e.g., a logic high state "1") and such deallocated blocks are replaced during the general operations of the cache memory apparatus 120.

Exemplary buffer block allocation and deallocation operations in the cache memory apparatus 120, according to some embodiments of the present invention, will now be described in detail.

Figure 7:
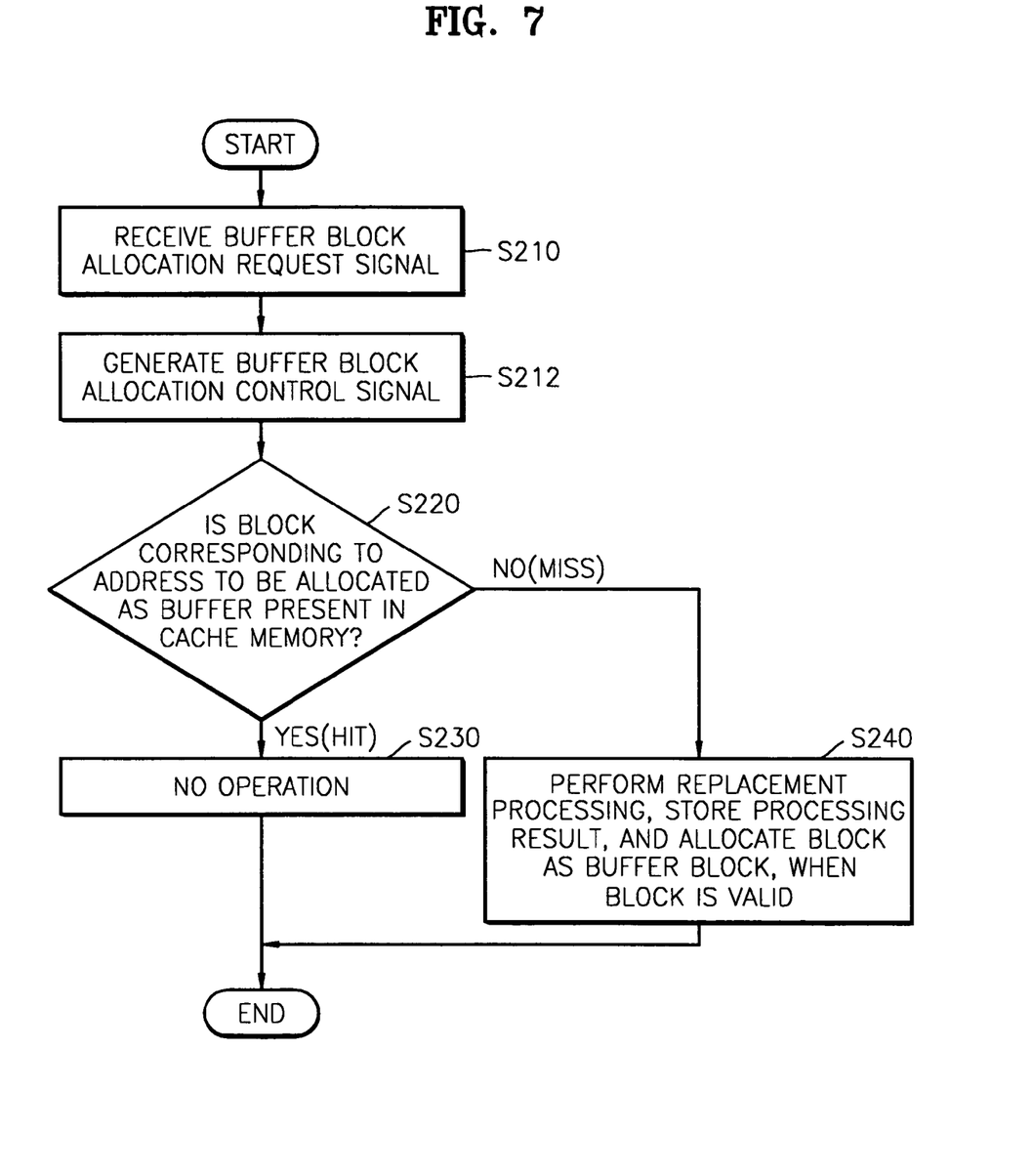
FIG. 7 is a flowchart that illustrates buffer block allocation operations in accordance with some embodiments of the present invention.

FIG. 7 is a flowchart that illustrates exemplary operations for buffer block allocation. Referring now to FIG. 7, some blocks of the cache memory 121 of FIG. 5 are allocated as the flexible buffer. First, when the processor 130 accesses the cache memory 121, the cache controller 123 stores the index address ADDR in the predetermined logic circuit 1233 or sets a mode and generates the buffer block allocation request signal ALLOC (block S210). In addition, the processor 130 may directly set a mode and perform a corresponding operation, thereby generating the buffer block allocation request signal ALLOC (block S210 ). Subsequently, the control portion 1231 receives the buffer block allocation request signal ALLOC and generates the buffer block allocation control signal CALLOC in response to the buffer block allocation request signal ALLOC (block S212). If a block corresponding to addresses to be allocated as a buffer has already been allocated as a buffer block and is present in the cache memory 121 (when a hit occurs), buffer block allocation is completed without an additional operation (blocks S220 and S230). Buffer block allocation may be performed when data is written to the cache memory 121. In this case, if the existing buffer block is valid, then data is updated after replacement processing is performed. However, if a block corresponding to the addresses to be allocated as the buffer is not allocated as the buffer block (when a miss occurs), when such a block is valid, the replacement processing is performed, the processing result is stored in the main memory 110, and the block is allocated as the buffer block (blocks S220 and S240). When a miss occurs in such buffer block allocation, buffer block allocation is performed without miss handling from the main memory 110.

Figure 8:
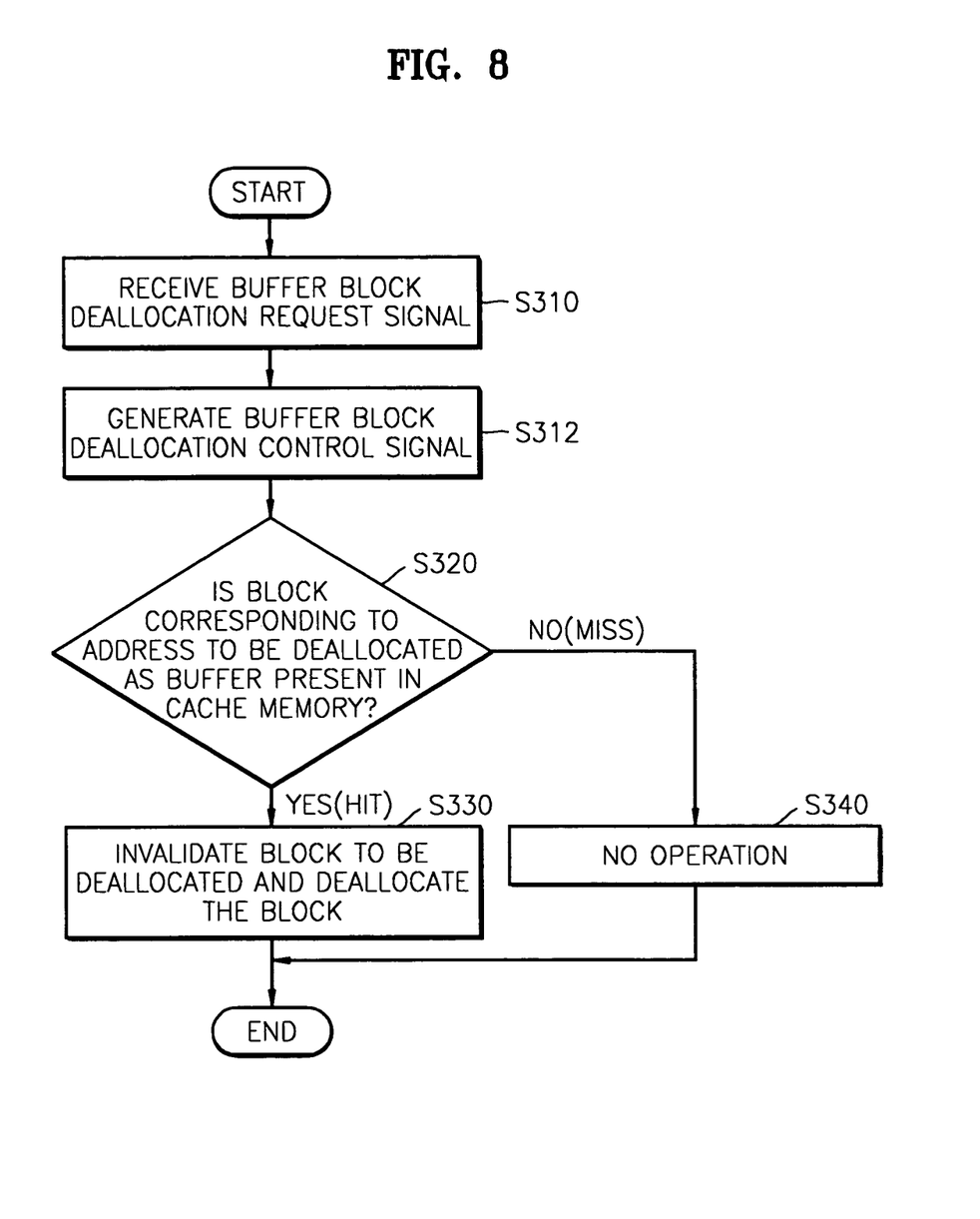
FIG. 8 is a flowchart that illustrates buffer block deallocation in accordance with some embodiments of the present invention.
Figure 11A:
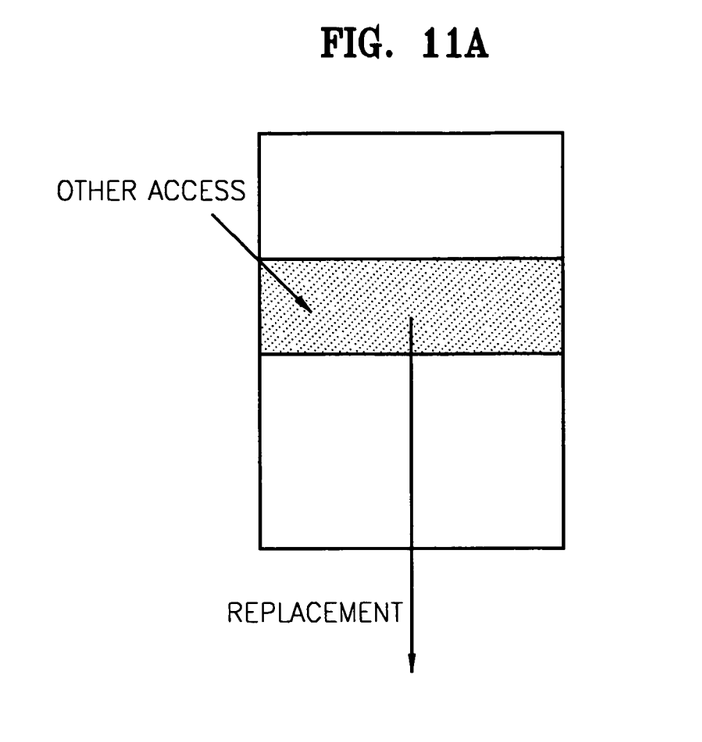
FIGS. 11A, 11B, and 11C are block diagrams that illustrate access to a cache memory during buffer block deallocation in accordance with some embodiments of the present invention.
Figure 11B:
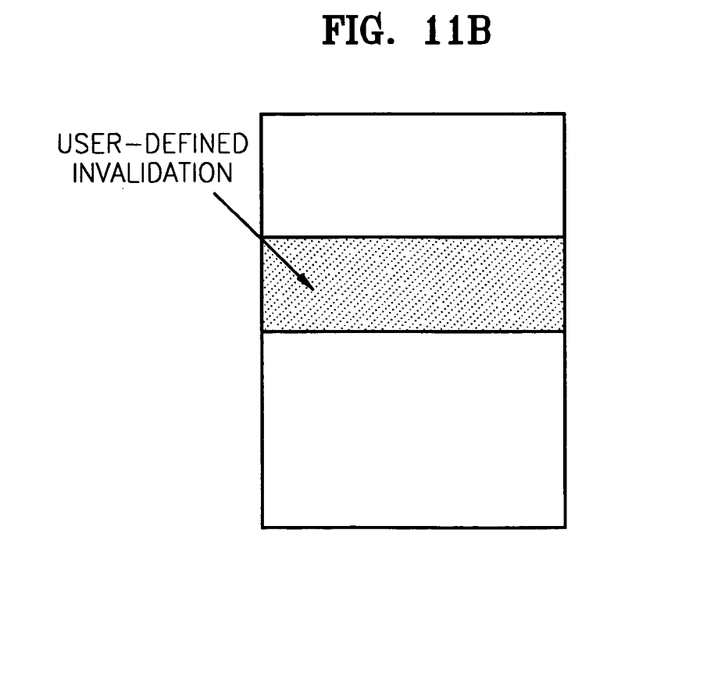
Figure 11C:
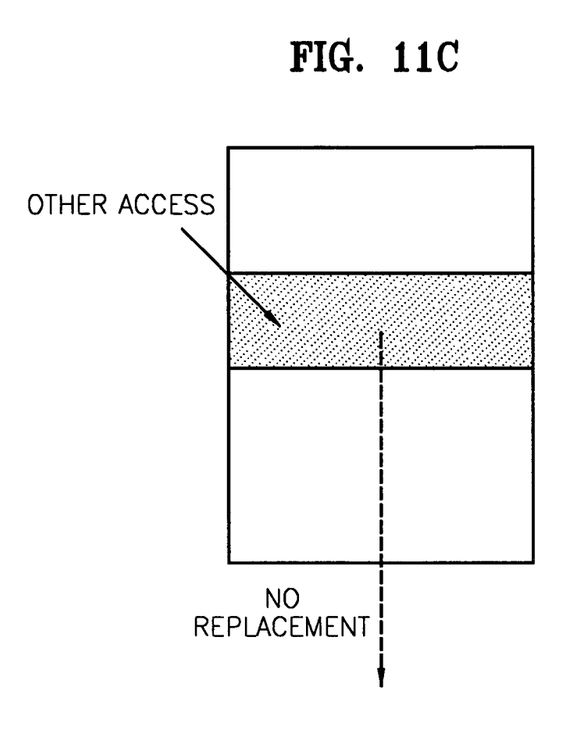

FIG. 8 is a flowchart that illustrates exemplary operations for buffer block deallocation. Referring now to FIG. 8, some blocks of the cache memory 121 that have been allocated as the flexible buffer are deallocated. First, when the processor 130 accesses the cache memory 121, the cache controller 123 stores the index address ADDR in the predetermined logic circuit 1233 or changes mode setting, thereby generating the buffer block deallocation request signal DEALLOC (block S310 ). In addition, the processor 130 may directly set a mode and perform a corresponding operation, thereby generating the buffer block deallocation request signal DEALLOC (block S310 ). Thus, the control portion 1231 receives the buffer block deallocation request signal DEALLOC and generates the buffer block deallocation control signal CDEAL-LOC in response to the buffer block deallocation request signal DEALLOC (block S312). At this time, if a block corresponding to addresses to be deallocated is present in the cache memory 121 (when a hit occurs), the valid bit V of the block is set to the first logic state "0", thereby invalidating the block, and the block is deallocated (blocks S320 and S330). However, if the block corresponding to the addresses to be deallocated is not present in the cache memory 121 (when a miss occurs), there is no block to be deallocated, and thus, buffer block deallocation is completed without an additional operation (blocks S320 and S340). During buffer block deallocation, the block to be deallocated is invalidated as shown in FIG. 11B. This is intended to alleviate problems, such as operating speed reduction and increased power consumption, due to an unnecessary write operation to the main memory 110 when, as shown in FIG. 11A, the valid bit V of the deallocated blocks that have been temporarily used for the flexible buffer remains in the second logic state "1," and the deallocated blocks are replaced during the general operations of the cache memory apparatus 120. When the blocks that have been temporarily used as the flexible buffer are deallocated, if the blocks to be deallocated are invalidated, the deallocated blocks are not replaced during the general operations of the cache memory apparatus 120. Since the invalidated blocks return to an ordinary cache memory state, replacement included in the general operations of the cache memory apparatus 120 may occur as shown in FIG. 11A after other valid data generated during the operation of the processor 130 are written to the invalidated blocks.

The following Algorithm 1 includes example code used during address setting for buffer block allocation or deallocation, during an allocation mode operation, and during a deallocation mode operation:

```
[Algorithm 1]
*buffer allocation/deallocation example
; buffer address setting
ld r1, buf_addr
; set buffer allocation mode
loop {
; corresponding region write
stb/h/w @[r1], r2
; line size
add r1, #16
}
...
...
...
; reclaim
ld r1 buf_addr
; set cache invalidation mode
loop {
   ld r2, @[r1]   ; dummy load
   add r1, #16    ; line size
}
```

In Algorithm 1, address setting for buffer block allocation or deallocation is performed by storing a start address in a register r1. During the buffer allocation mode operation, when the cache controller 123 performs a store instruction for a block starting from the start address stored in the register r1 and having a predetermined line size, a corresponding region is allocated as the buffer of the cache memory 121. After buffer allocation, an access of the cache memory 121 to the corresponding region is processed during one cycle without using an external buffer. During the buffer deallocation mode operation, when the cache controller 123 performs an invalidation instruction for the blocks starting from the start address stored in the register r1 and having the predetermined line size, the corresponding region is deallocated.

As described above, the cache memory apparatus 120, according to some embodiments of the present invention, includes a flexible buffer comprising some blocks of the tag memory and data memory that are allocated as the flexible buffer or deallocated to the cache memory 121. Buffer block allocation and deallocation are performed in response to the buffer block allocation control signal CALLOC and the buffer block deallocation control signal CDEALLOC, respectively, that are generated by the cache controller 123.

In the cache memory apparatus and/or the digital data processing system according to some embodiments of the present invention, some parts of the cache memory are dynamically allocated as the buffer or deallocated irrespective of the address or size of the buffer. Thus, it may be possible for a system using the cache memory to effectively access the buffer. In other words, after the buffer data is defined in the cache memory through a write operation to the buffer, when the buffer data is read for use in another operation, an unnecessary access to the main memory due to an operation characteristic of the cache memory can be avoided. Therefore, users can be provided with an intuitive and user-friendly programming interface.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

That which is claimed:

1. A cache memory system, comprising:
a processor;
a cache memory that comprises a first memory portion and a flexible buffer memory portion, the cache memory being configured to store data therein independent of a data type; and
a cache controller that is coupled to the cache memory and is configured to control allocation and/or deallocation of blocks from the first memory portion to and/or from the flexible buffer memory portion based on a mode and/or an index address;
wherein a location of a part of the first memory portion corresponds to an index or offset address of the processor stored in a part of the processor;
wherein the cache controller is further configured to generate a buffer block allocation control signal and/or a buffer block deallocation control signal responsive to access of the cache memory by the processor; and
wherein the cache memory is configured to allocate blocks from the first memory portion to the flexible buffer memory portion responsive to the buffer block allocation control signal and to deallocate blocks from the flexible buffer memory portion to the first memory portion responsive to the buffer block deallocation control signal;
wherein the cache controller comprises:
a logic circuit that comprises a mode register and an index address register and is configured to generate a buffer block allocation request signal and/or a buffer block deallocation request signal responsive to the mode register being set by the processor and/or the index address being stored in the index address register by the processor; and
a control portion that is coupled to the logic circuit that is configured to generate the buffer block allocation control signal responsive to the buffer block allocation request signal and to generate the buffer block deallocation control signal responsive to the buffer block deallocation request signal.

2. The cache memory system of claim 1, wherein the cache memory is further configured to deallocate blocks from the flexible buffer memory portion to the first memory portion responsive to the buffer block deallocation control signal by setting respective validity bits in the blocks to be deallocated indicating that the blocks are invalid.

3. The cache memory system of claim 1, wherein the first memory portion comprises a tag memory portion and a data memory portion.

4. The cache memory system of claim 3, wherein the tag memory portion is configured to store a tag address in a location that corresponds to a relative location of the index address in an address space of the processor, and wherein the data memory portion is configured to store data in a location that corresponds to a relative location of the offset address in an address space of the processor.

5. A data processing system, comprising:
a main memory;
a cache memory that comprises a first memory portion and a flexible buffer memory portion, the cache memory being configured to store data therein independent of a data type;
a processor that is configured to execute instructions stored in the main memory and the cache memory based on addresses of the instructions;
a cache controller that is coupled to the cache memory and is configured to control allocation and/or deallocation of blocks from the first memory portion to and/or from the flexible buffer memory portion based on a mode and/or an index address;
wherein a location of a part of the first memory portion corresponds to an index or offset address of the processor stored in a part of the processor;
wherein the cache controller is further configured to generate a buffer block allocation control signal and/or a buffer block deallocation control signal responsive to access of the cache memory by the processor; and
wherein the cache memory is configured to allocate blocks from the first memory portion to the flexible buffer memory portion responsive to the buffer block allocation control signal and to deallocate blocks from the flexible buffer memory portion to the first memory portion responsive to the buffer block deallocation control signal;
wherein the controller comprises:
a logic circuit that comprises a mode register and an index address register and is configured to generate a buffer block allocation request signal and/or a buffer block deallocation request signal responsive to the mode register being set by the processor and/or the index address being stored in the index address register by the processor; and
a control portion that is coupled to the logic circuit that is configured to generate the buffer block allocation control signal responsive to the buffer block allocation request signal and to generate the buffer block deallocation control signal responsive to the buffer block deallocation request signal.

6. A method of operating a cache memory system, comprising:

allocating a first memory portion and a flexible buffer memory portion in a cache memory, the cache memory being configured to store data therein independent of a data type;
controlling allocation of blocks from the first memory portion to the flexible buffer memory portion using a cache controller; and
controlling deallocation of blocks from the first memory portion to the flexible buffer memory portion using a cache controller based on a mode and/or an index address;
wherein a location of a part of the first memory portion corresponds to an index or offset address of the processor stored in a part of a processor;
generating a buffer block allocation control signal at the cache controller responsive to access of the cache memory by a processor; and
generating a buffer block deallocation control signal at the cache controller responsive to access of the cache memory by the processor;
allocating blocks from the first memory portion to the flexible buffer memory portion responsive to the buffer block allocation control signal; and
deallocating blocks from the flexible buffer memory portion to the first memory portion responsive to the buffer block deallocation control signal;
generating a buffer block allocation request signal and/or a buffer block deallocation request signal responsive to a mode register being set by the processor and/or the index address being stored in an index address register by the processor;
generating the buffer block allocation control signal responsive to the buffer block allocation request signal; and
generating the buffer block deallocation control signal responsive to the buffer block deallocation request signal.

7. The method of claim 6, wherein deallocating blocks comprises deallocating blocks from the flexible buffer memory portion to the first memory portion responsive to the buffer block deallocation control signal by setting respective invalidity bits in the blocks to be deallocated indicating that the blocks are invalid.

8. The method of claim 6, wherein allocating the first memory portion and the flexible buffer memory portion in the cache memory comprises:
allocating the flexible buffer memory portion in the cache memory when the processor accesses the cache memory.

9. The method of claim 6, wherein allocating the first memory portion and the flexible buffer memory portion in the cache memory comprises:
allocating the flexible buffer memory portion in the cache memory before the processor accesses the cache memory.

10. The method of claim 6, wherein controlling allocation of blocks from the first memory portion to the flexible buffer memory portion using the cache controller comprises controlling allocation of blocks from the first memory portion to the flexible buffer memory portion using the cache controller responsive to execution of instructions by a the processor; and
wherein controlling deallocation of blocks from the first memory portion to the flexible buffer memory portion using a cache controller comprises controlling deallocation of blocks from the first memory portion to the flexible buffer memory portion using the cache controller responsive to execution of instructions by the processor.

11. The method of claim 6, wherein controlling allocation of blocks from the first memory portion to the flexible buffer memory portion using the cache controller and controlling deallocation of blocks from the first memory portion to the flexible buffer memory portion using the cache controller comprises:
- generating addresses of blocks to be allocated to the flexible buffer memory portion at the cache controller;
- deallocating blocks that have been allocated to the flexible buffer memory portion; and
- allocating blocks corresponding to the generated addresses to the flexible buffer memory portion.

12. A method of operating a data processing system, comprising:
- providing a main memory and a cache memory, the cache memory being configured to store data therein independent of a data type;
- allocating a first memory portion and a flexible buffer memory portion in the cache memory;
- controlling allocation of blocks from the first memory portion to the flexible buffer memory portion using a cache controller;
- controlling deallocation of blocks from the first memory portion to the flexible buffer memory portion using a cache controller based on a mode and/or an index address; and
- executing instructions stored in the main memory and the cache memory based on addresses of the instructions using a processor;
- wherein a location of a part of the first memory portion corresponds to an index or offset address of the processor stored in a part of a processor;
- generating a buffer block allocation control signal at the cache controller responsive to access of the cache memory by a processor
- generating a buffer block deallocation control signal at the cache controller responsive to access of the cache memory by the processor;
- allocating blocks from the first memory portion to the flexible buffer memory portion responsive to the buffer block allocation control signal;
- deallocating blocks from the flexible buffer memory portion to the first memory portion responsive to the buffer block deallocation control signal;
- generating a buffer block allocation request signal and/or a buffer block deallocation request signal responsive to a mode register being set by the processor and/or the index address being stored in an index address register by the processor;
- generating the buffer block allocation control signal responsive to the buffer block allocation request signal; and
- generating the buffer block deallocation control signal responsive to the buffer block deallocation request signal.

13. The method of claim 12, wherein deallocating blocks comprises deallocating blocks from the flexible buffer memory portion to the first memory portion responsive to the buffer block deallocation control signal by setting respective invalidity bits in the blocks to be deallocated indicating that the blocks are invalid.

* * * * *